United States Patent
Burd et al.

(10) Patent No.: US 7,571,372 B1
(45) Date of Patent: Aug. 4, 2009

(54) METHODS AND ALGORITHMS FOR JOINT CHANNEL-CODE DECODING OF LINEAR BLOCK CODES

(75) Inventors: Gregory Burd, San Jose, CA (US); Zining Wu, Los Altos, CA (US)

(73) Assignee: Marvell International Ltd., Hamilton (BM)

(*) Notice: Subject to any disclaimer, the term of this patent is extended or adjusted under 35 U.S.C. 154(b) by 668 days.

(21) Appl. No.: 11/166,548

(22) Filed: Jun. 23, 2005

(51) Int. Cl.
*G11B 20/18* (2006.01)
*H03M 13/05* (2006.01)

(52) U.S. Cl. ................................ 714/769; 714/781
(58) Field of Classification Search ............... 714/755, 714/758, 769, 795, 781
See application file for complete search history.

(56) References Cited

U.S. PATENT DOCUMENTS

| | | | |
|---|---|---|---|
| 4,916,702 A * | 4/1990 | Berlekamp | 714/762 |
| 5,802,078 A * | 9/1998 | Urabe et al. | 714/759 |
| 6,040,953 A * | 3/2000 | Malone et al. | 360/53 |
| 6,427,220 B1 | 7/2002 | Vityaev | |
| 6,456,208 B1 | 9/2002 | Nazari et al. | |
| 6,473,010 B1 | 10/2002 | Vityaev et al. | |
| 6,526,530 B1 | 2/2003 | Nazari et al. | |
| 6,530,060 B1 * | 3/2003 | Vis et al. | 714/792 |
| 6,543,023 B2 * | 4/2003 | Bessios | 714/758 |
| 6,711,225 B1 | 3/2004 | Sutardja et al. | |
| 6,823,487 B1 * | 11/2004 | Poeppelman | 714/785 |
| 6,981,201 B2 * | 12/2005 | Reggiani et al. | 714/786 |
| 6,986,098 B2 * | 1/2006 | Poeppelman et al. | 714/807 |
| 7,089,483 B2 * | 8/2006 | McEwen et al. | 714/795 |
| 7,260,766 B2 * | 8/2007 | Levy et al. | 714/780 |

OTHER PUBLICATIONS

U.S. Appl. No. 10/208,312, filed Jul. 29, 2002.
U.S. Appl. No. 10/689,660, filed Oct. 31, 2003.
Zining Wu and Gregory Burd; Error Correction Using Error Detection Codes; U.S. Appl. No. 10/752,339, filed Jan. 6, 2004.

* cited by examiner

*Primary Examiner*—Stephen M Baker

(57) ABSTRACT

Circuits, architectures, methods and algorithms for joint channel-code decoding of linear block codes, and more particularly, for identifying and correcting one or more errors in a code word and/or for encoding CRC (or parity) information. In one aspect, the invention focuses on use of (i) remainders, syndromes or other polynomials and (ii) Gaussian elimination to determine and correct errors. Although this approach may be suboptimal, the present error checking and/or detection scheme involves simpler computations and/or manipulations than conventional schemes, and is generally easier to implement logically. Since the complexity of parity-based error correction schemes increases disproportionately to the number of potential error events, the present invention meets a long-felt need for a scheme to manage error detection and/or correction in systems (such as magnetic recording applications) where there may be a relatively large number of likely error events, thereby advantageously improving reliability and/or performance in channel communications.

35 Claims, 8 Drawing Sheets

METHODS AND ALGORITHMS FOR JOINT CHANNEL-CODE DECODING OF LINEAR BLOCK CODES

FIELD OF THE INVENTION

The present invention relates generally to joint channel-code detectors. More particularly, the present invention relates to the design and (hardware) implementation of joint channel-code detectors for linear block codes. Although the discussion of the present invention herein below shall primarily refer to applications to magnetic recording channels, the approaches discussed herein can easily be adapted to many other communication channels.

DISCUSSION OF THE BACKGROUND

For some linear block codes, one may design a joint Maximum Likelihood (ML) channel-code detector. However, these detectors tend to be very complicated, even for relatively simple (and ultimately weak) codes. In some special cases, one may obtain reasonable performance by completely separating the channel detector 12 from the code decoder 14, as shown in the system 10 in FIG. 1.

A system such as that shown in FIG. 1 could use, for example, Reed-Solomon (RS) Error Correction Code (ECC). RS codes have implementation-efficient algebraic decoders that can decode up to (or even beyond) half the minimum distance of the code. Nevertheless, the performance of such a detector 10 is much worse compared to what can be achieved by joint ML channel-code decoders.

In some instances, the error correction capability of linear block code might not be sufficient to meet the demands of certain applications. In effect, such poor error correction capability precludes one from running a linear block code decoder separately from the channel detector. FIG. 2 shows a block diagram for a system 20 employing an outer RS ECC encoder 22 in concatenation with an inner Cyclic Redundancy Code (CRC) encoder 24 that is commonly used in magnetic recording channels.

In magnetic recording applications, the outer RS ECC code is designed to cover a relatively large block of data (e.g., 512 bytes). On the contrary, the inner ECC (n, k) code has a smaller block length. For this reason, the RS ECC output is partitioned into a plurality of blocks, having length k. Each block is then encoded into n-bit long CRC code words. CRC code words are concatenated together and transmitted over a noisy channel (e.g., a channel that introduces non-negligible random and/or Gaussian noise into a transmission).

FIG. 3 shows an exemplary decoder 30 for a magnetic recording system, matched to the encoder system 20 in FIG. 2. Decoder 30 generally includes a Viterbi detector 32, a post processor 34, and a RS ECC decoder 36. In the decoder architecture 30 of FIG. 3, the inner CRC code is decoded with Post Processor circuit ("PP detector") 34. PP detector 34 assumes the presence of a primary channel detector (e.g., Viterbi detector 32). Thereafter, two further simplifying assumptions are typically made to enable PP-based implementations.

First, PP-based implementations generally assume that all errors following the Viterbi detector come from the list of dominant error events, designated herein as E. Different channels may have different lists of dominant error events, and therefore, the contents of E are generally determined before use. For instance, in certain magnetic recording channel applications, E can be {+, +−, −+, +0+, +−+−, +−+−+}. Of course, more error events can be added to the list, but there is a very practical trade-off between performance (e.g., processing speed) and complexity (e.g., number of error events in E). Secondly, PP-based approaches generally assume that there are at most M errors per CRC codeword.

These assumptions may lead to performance degradation. For instance, if the true error event corrupting some CRC codeword is not an element of E, or if there is a composite error event consisting of more than M (e.g., some combination of two or more events within E), PP architectures are generally not going to be able to find the transmitted codeword. To make things worse, a PP architecture may converge to an incorrect CRC codeword (e.g., a codeword other than the one that was transmitted) or erroneously correct the CRC codeword, which may actually increase the number of errors present in the CRC codeword following Viterbi detection. Caution should be taken to minimize occurrences of erroneous correction.

Before post processing can be performed, Viterbi detector 32 obtains a most likely path through the trellis based on the received samples. The Viterbi detector 32 generally does not take any CRC constraints into account, and as a result, the PP 34 is used to improve upon the Viterbi detector results by searching for the best path through the trellis which satisfies the CRC constraint(s).

In CRC code theory, it is helpful to represent CRC code words as polynomials over some finite field, F. With each codeword $c=(c_0, c_1, \ldots, c_{n-1})$ (i.e., a string of symbols from field F), we can associate a polynomial $c(x)$ over F of degree less than n, given by $$c(x) = \sum_{i=0}^{n-1} c_i x^i.$$

Equivalently, every polynomial over field F of degree less than n can be represented as a string of n symbols, where the $i^{th}$ symbol coincides with the coefficient of $x^i$, $i=0, 1, \ldots, n-1$. CRC code may be specified in terms of a generator polynomial $g(x)$. The codeword $c(x)$ is said to belong to the codeword space of the CRC(n,k) code defined by the generating polynomial $g(x)$ if and only if $g(x)$ divides $c(x)$ without a remainder (i.e., $\text{Rem}(c(x),g(x))=0$, where 0 stands for a zero polynomial). The invention will be explained often herein with reference to binary CRC codes (i.e., where $F=GF(2)$); however, it should be apparent to those skilled in art that the inventive concepts described herein can be easily applied to or extended to codes over higher order fields. It is also convenient to represent members of E in polynomial notation as well, e.g. $E=\{1, 1+x, 1+x+x^2, 1+x^2, 1+x+x^2+x^3, 1+x+x^2+x^3+x^4\}$.

As discussed above, the concatenation of outer RS ECC code with inner CRC code has been widely used in magnetic recording systems in recent years. Most popular system architectures employ shortened (61, 60) single parity check (SPC) cyclic binary code, with a generator polynomial given by $g(x)=1+x$ as the inner ECC (also see, e.g., U.S. Pat. Nos. 6,526,530 and 6,456,208, the relevant portions of which are incorporated herein by reference). Some other popular choices for inner ECC are those generated by the polynomials $g(x)=1+x^2$, $g(x)=1+x+x^3$, and $g(x)=1+x+x^2+x^4$, and having a block length under 100-120 bits. The codes described above have very small minimum distances, and as a result, are not very good at error correction. For instance, SPC code has $d_{min}=2$, and as a result, it is unable to correct a single error. Consequently, on the decoding side, the error detection properties of inner ECC codes are generally used in conjunction with channel metrics to perform error correction.

A Maximum Likelihood Distance Penalty (MLDP) may be assigned to (or calculated for) the paths corresponding to a single dominant error event. Referring now to FIG. 3, let v(x) denote the plurality of Viterbi decisions (i.e., a set or series of possible sequences determined by Viterbi decoder 32 for data received from a channel). For each location of the CRC codeword, PP 34 forms an alternative path to the output of Viterbi decoder 32 by inserting one of the dominant error events from the list E into the Viterbi decision bit stream. In polynomial notation, the alternative path corresponding to the dominant error event e at some bit position l can be written as $v(x)+e(x)x^l$. For each alternative path (note that n*|E| such paths can be formed for a single CRC codeword; each of n locations can have |E| alternative paths), PP 34 assigns a measure of likelihood by computing the MLDP), which is given by the Path Metric (PM) difference between the alternative path and Viterbi decision bit stream, $MLDP(e)=PM(v(x)+e(x)x^l)-PM(v(x))$. Since Viterbi detector 32 outputs the most likely path through the trellis (i.e., the path with the smallest PM), MLDP (e) is always greater than or equal to 0.

However, if e is a composite error event (e.g., $e=e_1+e_2+\ldots+e_k$, where e consists of several non-overlapping dominant error events), then $$MLDP(e) = \sum_{i=1}^{k} MLDP(e_i),$$

where $MLDP(e_i)$ is the composite penalty of the individual component error events, i=1, 2, ..., k. If the component error events overlap, or if the number of bits between two component error events (from the end of one to the beginning of the next) is less than channel memory, the above formula does not apply. Consequently, MLDP for overlapped error events are difficult to calculate. Therefore, even if such error events are selected by a PP algorithm, they should be disabled in the correction block if their MLDP can not be accurately calculated.

An MLDP can be computed based on the likelihood measure used by Viterbi detector 32. Alternatively, it is possible to assign likelihoods using a more computation-intensive likelihood function (e.g. one taking data dependent noise into account; see, e.g., U.S. patent application Ser. Nos. 10/208, 312, filed on Jul. 29, 2002, and 10/689,660, filed on Oct. 31, 2003, the relevant portions of which are incorporated herein by reference). If the latter is used, then the formula $MLDP(v(x)+e(x))$ is not necessarily greater than or equal to zero, since v(x) is not necessarily optimal with respect to the data dependent likelihood function.

Once the penalties corresponding to various error events have been computed, PP 34 searches for an alternative path corresponding to a combination of at most M error events that (1) bring v(x) into the codeword space of the inner ECC and (2) has smallest MLDP among all such paths. Herein, the term "v(x)" is used to denote the plurality of Viterbi decisions, as well as a subset of these decisions corresponding to a particular CRC codeword. Where applicable, the context of any given use of "v(x)" herein may impart a particular meaning to those skilled in the art.

Let v(x) be the received CRC codeword. If r(x)=Rem(v(x), g(x))=0, then either v(x) equals the transmitted CRC codeword, or r(x) is corrupted by an error event that cannot be detected by CRC. In either case, PP 34 does not make any corrections. On the other hand, if Rem(v(x),g(x))=r(x) does not equal a zero polynomial, then v(x) is corrupted by some error pattern which can be identified using the methodology of the PP detector 34 (assuming that all of the assumptions made by PP detector 34 hold true). FIG. 4 depicts circuitry 40 for carrying out polynomial division which is commonly used to compute remainders.

As PP 34 processes alternative paths, attention tends to be directed to those error events that bring v(x) into the codeword space, or the paths for which Rem(v(x)+e(x), g(x))=0, or more generally, $Rem(v(x)+e_1(x)+e_1(x)+\ldots+e_k(x), g(x))=0$. Methods for computing a remainder corresponding to a dominant error event e are discussed below. However, it is worth noting that one does not necessarily need to use polynomial division logic to compute the remainders corresponding to composite error events. Once the remainder of each component error event is known, one can utilize linearity to obtain the following identity: $Rem(v(x)+e_1(x)+e_2(x)+\ldots+e_k(x), g(x))=Rem(v(x), g(x))+Rem(e_1(x), g(x))+Rem(e_2(x), g(x))+\ldots+Rem(e_k(x), g(x))$. Thus, the remainder corresponding to a composite error event e can be obtained as a sum over field F of the remainders of the component error events.

To summarize, the operation of PP 34 includes the following steps for each received CRC codeword, v(x):

1. Compute the remainder r(x)=Rem(v(x), g(x)). If r(x)=0, then the Viterbi decoder has output either a codeword with no errors or a codeword that cannot be corrected using PP 34; otherwise go to step 2.
2. Form a set of alternative paths P, where each path p in P corresponds to some dominant error event e(x) in E, i.e. p(x)=v(x)+e(x). For each such path, compute MLDP(e) and Rem(e(x), g(x)).
3. Extend the collection P by possibly adding paths corresponding to composite error events, whose MLDP and remainders can be computed based on similar quantities for individual components of e(x).
4. Search for the path p(x) in P corresponding to an error event or a combination of error events satisfying:
   a. Rem(p(x), g(x))=0; and
   b. Among the p(x) satisfying 4(a), choose the one with the smallest MLDP:

$$p = \min_{p' \in P}(MLDP(p')).$$

5. If step 4 produces a non-trivial candidate p(x), then correct the codeword using candidate p(x); otherwise decoder failure is declared.

The size of P is proportional to the cardinality of E, the length of the CRC code, n, and the value of parameter M, which bounds maximum number of error events which can be corrected per sector. It can be seen that the cardinality of P gets to be very large even for moderate values of |E|, n, and M. To reduce the complexity of the operations of PP 34, it is common to reduce the size of P following step 2 by keeping only the N best paths or N most likely errors with respect to MLDP prior to moving on to step 3. However, even for relatively small values of N, the number of paths to be considered in step 4 can be very large. For example, consider the case where N=10 and M=4, where the cardinality of P following step 3 is $$\binom{10}{1}+\binom{10}{2}+\binom{10}{3}+\binom{10}{4}=394.$$

In the past, the choice of CRC codes which can be implemented in practice were limited to codes having relatively small block length n (generally, under 120 bits), due to the complexity of having to search through a large number of paths. As n grows, the parameter M also generally increases, since the probability of having multiple error events in a single CRC codeword increases with codeword size. However, as previously discussed, the complexity of a PP-based architecture is ultimately related to the choice of parameter M. On the other hand, short CRC codes are not optimal either due to (i) the relatively low error detection and correction capability of these codes and/or (ii) the high code rate penalty they inflict on the communication system.

FIG. 5 shows a conventional process 50 for checking and correcting errors in data blocks transmitted over a channel using CRC code. First, a code word or code block is received in step 52. The channel typically introduces some noise into the transmitted code, and as a result, the received code word or block may be considered "noisy." Thereafter, in step 54, the received code words are decoded, then in step 56, the received code word is divided by a generator polynomial g(x) to determine the remainder r(x)=Rem(v(x),g(x))(g(x) is generally known to the receiver as well as the transmitter, and does not change from codeword to codeword or sector to sector). Step 56 is essentially the error checking part of the process 50. A processing decision is made in step 60, depending on whether a zero remainder is obtained form the code word division step 56. If a zero remainder is obtained, then one may conclude that there is no error in the transmitted code word in result 62, and the decoded code word obtained in step 54 may be output.

On the other hand, if r(x) does not equal a zero polynomial, then there is an error in v(x), and the received code word has to be corrected. The corrected code words (generally corresponding to the paths p(x) in alternative path set P above) are then divided by the generator polynomial in step 66, similar to the process in step 56. The paths are searched for those that provide a zero remainder, then a decision is made on further processing of the corrected code word(s) in step 70, depending on whether any paths having a zero polynomial are found in step 68. If not, then the received code word is not corrected, and decoding failure is declared (see result 72). If one or more paths having a zero polynomial are obtained, then the path having the smallest penalty is identified (see decision 80). The corrected code word for which a non-trivial path having the smallest penalty is output as the decoded code word (see result 82). However, if such a non-trivial candidate path is not identified, then the received code word is not corrected and decoding failure is declared (see result 84).

SUMMARY OF THE INVENTION

Embodiments of the present invention relate to circuitry, architectures, systems, methods, algorithms and software for joint channel-code detectors, particularly for linear block codes. In one aspect, the present invention relates to a post processor, comprising (a) a list generator and (b) search logic. The list generator is generally configured to (1) generate a list of most likely error events for a data block and (2) compute an error event remainder for each of the most likely error events. The search logic is generally configured to determine a number of error correction solutions for the data block from (i) the most likely error event remainders and (ii) a remainder for the data block.

Another aspect of the invention relates to an encoder, comprising (A) placeholding logic; (B) a CRC encoding circuit configured to compute actual CRC information for the data block; and (C) a CRC information substituting circuit. The placeholding logic is generally configured to (i) insert dummy CRC information segments at or between a plurality of predetermined positions in a data block and (ii) output a dummy-padded data block. The CRC information substituting circuit is generally configured to substitute portions of the actual CRC information for the dummy CRC information segments in the dummy-padded data block. The architectures and/or systems generally comprise those that include a circuit embodying one or more of the inventive concepts disclosed herein.

Other aspects of the present invention relate to methods of identifying and/or correcting one or more errors in a data block, and encoding CRC information. The error identification and/or correction method generally comprises the steps of (1) forming a matrix from one or more most likely error event remainders; (2) augmenting the matrix with a data block remainder; and (3) determining, by Gaussian elimination, a number of error correction solutions for the data block in the augmented matrix. The encoding method generally comprises the steps of (a) inserting dummy CRC information segments at or between a plurality of predetermined positions in a data block to generate a dummy-padded data block; (b) computing actual CRC information for the data block; and (c) substituting corresponding segments of the actual CRC information for the dummy CRC information in the plurality of predetermined positions in the dummy-padded data block to generate an CRC-encoded data block. The algorithms and/or software are generally configured to implement one or more of the present methods and/or any process or sequence of steps embodying the inventive concepts described herein.

The present invention focuses on the joint channel-code decoding of inner CRC, generally implemented in a post processor or circuit including a post processor. Thus, the present invention concerns, in one important aspect, a detector implementation for performing steps 3 and 4 listed below paragraph [0018] above, described with reference to a PP decoding architecture. The outer RS ECC decoder may be separated from inner CRC decoding circuitry, as discussed above. The new architecture facilitates PP implementation for codes with large block length and allows parameter N to be set as high as deg(g(x)). For instance, the present PP design can easily support (1023, 1012) CRC codes with $g(x)=1+x+x^7+x^8+0+x^{10}+x^{11}$, where n=deg(g(x))=11, or (4096+43, 4096) code where n=deg(g(x))=43.

DETAILED DESCRIPTION OF THE PREFERRED EMBODIMENTS

Figure 1:
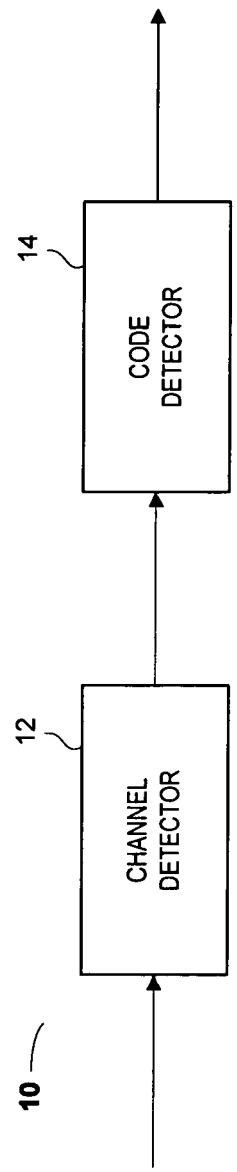
FIG. 1 is a block diagram showing a conventional data receiving system, in which the channel detector is separated from the code detector.
Figure 2:
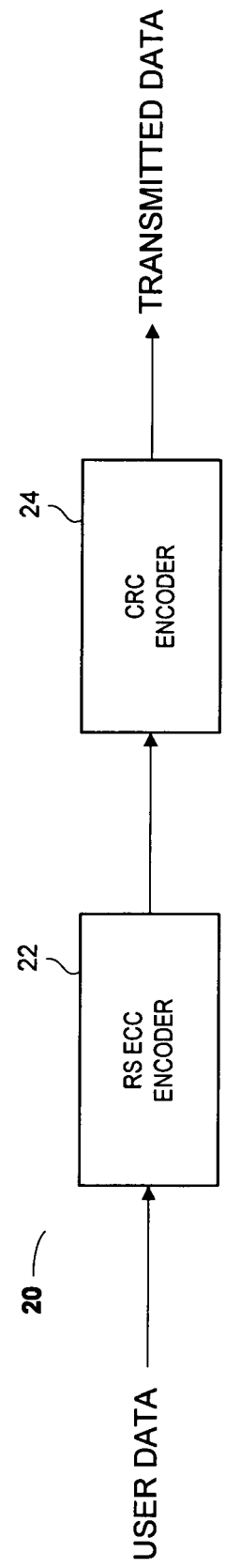
FIG. 2 is a block diagram showing a conventional encoding system commonly used in magnetic recording channels.
Figure 3:
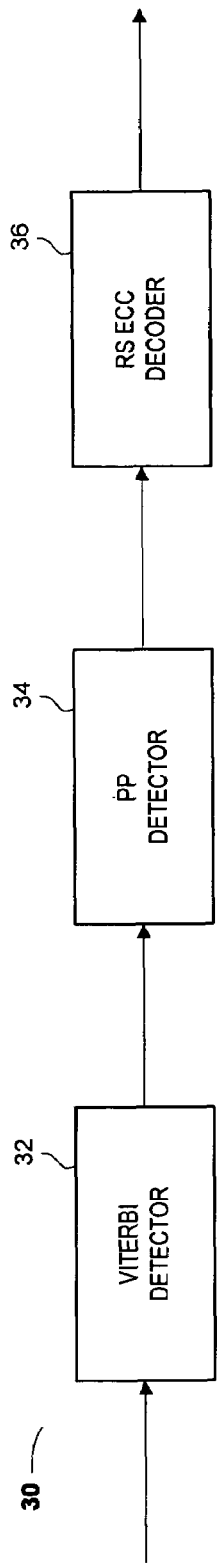
FIG. 3 is a block diagram showing a conventional decoder for a magnetic recording system, matched to the encoding system in FIG. 2.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it will be readily apparent to one skilled in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of processes, procedures, logic blocks, functional blocks, processing, and other symbolic representations of operations on data bits, data streams or waveforms within a computer, processor, controller and/or memory. These descriptions and representations are generally used by those skilled in the data processing arts to effectively convey the substance of their work to others skilled in the art. A process, procedure, logic block, function, operation, etc., is herein, and is generally, considered to be a self-consistent sequence of steps or instructions leading to a desired and/or expected result. The steps generally include physical manipulations of physical quantities. Usually, though not necessarily, these quantities take the form of electrical, magnetic, optical, or quantum signals capable of being stored, transferred, combined, compared, and otherwise manipulated in a computer, data processing system, or logic circuit. It has proven convenient at times, principally for reasons of common usage, to refer to these signals as bits, waves, waveforms, streams, values, elements, symbols, characters, terms, numbers, or the like.

It should be borne in mind, however, that all of these and similar terms are associated with the appropriate physical quantities and are merely convenient labels applied to these quantities. Unless specifically stated otherwise and/or as is apparent from the following discussions, it is appreciated that throughout the present application, discussions utilizing terms such as "processing," "operating," "computing," "calculating," "determining," "manipulating," "transforming," or the like, refer to the action and processes of a computer, data processing system, logic circuit or similar processing device (e.g., an electrical, optical, or quantum computing or processing device), that manipulates and transforms data represented as physical (e.g., electronic) quantities. The terms refer to actions, operations and/or processes of the processing devices that manipulate or transform physical quantities within the component(s) of a system or architecture (e.g., registers, memories, other such information storage, transmission or display devices, etc.) into other data similarly represented as physical quantities within other components of the same or a different system or architecture.

Furthermore, for the sake of convenience and simplicity, the terms "clock," "time," "rate," "period" and "frequency" are generally used interchangeably herein, but are generally given their art-recognized meanings. Also, for convenience and simplicity, the terms "data," "data stream," "waveform" and "information" may be used interchangeably, as may the terms "connected to," "coupled with," "coupled to," and "in communication with" (which terms also refer to direct and/or indirect relationships between the connected, coupled and/or communication elements unless the context of the term's use unambiguously indicates otherwise), but these terms are also generally given their art-recognized meanings. More specifically, however, the terms "finite impulse response filter," "FIR filter" and "equalizer" generally have the same meaning (as explained in greater detail below).

The present invention concerns a circuit, architecture, system, method, algorithm and software for joint channel-code detectors, particularly for linear block codes. Thus, in one aspect, the present invention relates to a post processor, comprising (a) a list generator configured to (i) generate a list of most likely error events for a data block and (ii) compute an error event remainder for each of the most likely error events, and (b) search logic configured to determine a number of error correction solutions for the data block from (i) the most likely error event remainders and (ii) a remainder for the data block.

The invention also relates to an encoding circuit, generally comprising (A) placeholding logic configured to (i) insert dummy error checking and/or correction (ECC) information segments into or between a plurality of predetermined positions in a fixed-length data block and (ii) output a dummy-padded data block; (B) an ECC encoding circuit configured to compute actual ECC information for the dummy-padded data block; and (C) an ECC information substituting circuit, configured to substitute portions of the actual ECC information for the dummy ECC information segments in the dummy-padded data block. The architectures generally comprise at least one of the present circuits and/or any other circuit embodying the inventive concepts described herein.

A further aspect of the invention concerns methods of encoding CRC information and identifying and/or correcting one or more errors in a data block. The error identification and/or correction method generally comprises the steps of (a) forming a matrix from one or more most likely error event remainders; (b) augmenting the matrix with a data block remainder; and (c) determining, by Gaussian elimination, a number of error correction solutions for the data block in the augmented matrix. The encoding method generally comprises the steps of (1) inserting dummy CRC information segments at or between a plurality of predetermined positions in the data block to generate a dummy-padded data block; (2) computing actual CRC information for the data block; and (3) substituting corresponding segments of the actual CRC information for the dummy CRC information in the plurality of predetermined positions in the dummy-padded data block to generate an CRC-encoded data block. The algorithm and/or software are generally configured to implement one or more of the present methods and/or any process or sequence of steps embodying the inventive concepts described herein.

Although this application primarily describes and discusses CRC codes, all of the inventive concepts disclosed herein can be readily applied to a wider class of block linear codes. Linear block (n,k) codes over the finite field F can be defined in terms of a k-by-n generator matrix G or an (n–k)-by-n parity check matrix H (both matrices are over the field F). The codeword space then includes all of the n-tuples c in $F^n$ satisfying $Hc^T=0$. If v is a received codeword, then one can compute a syndrome $s=Hv^T$. Clearly v is in the codeword space if and only if s equals a zero vector. In most respects, syndromes for linear block codes are equivalent to remainders for CRC (of course, the latter has more structure). It turns out that the properties of remainders which are used by PP architectures also hold true for syndromes. Therefore, to extend a PP architecture to linear block code, one simply replaces remainder computations and manipulations with those of syndrome vectors. For example, $H(v+e_1+e_2+ \ldots +e_k)^T=Hv^T+He_1^T+He_2^T+ \ldots +He_k^T$, similar to the principle of linearity of remainders. Thus, the present invention further relates to a circuit, comprising (a) a list generator configured to (i) generate a list of most likely error events for a binary data block and (ii) compute an error event syndrome for each of said most likely error events; and (b) search logic configured to determine a number of error correction solutions for the binary data block from (i) the error event syndromes and (ii) a syndrome for the binary data block. As discussed herein, any other aspect of the present invention that relates to CRC code and/or remainders that can apply to binary block codes and/or syndromes is applicable to the circuit in the preceding sentence.

The present invention, in its various aspects, will be explained in a greater detail in the context of magnetic recording system applications.

An Exemplary Magnetic Recording System

Figure 6:
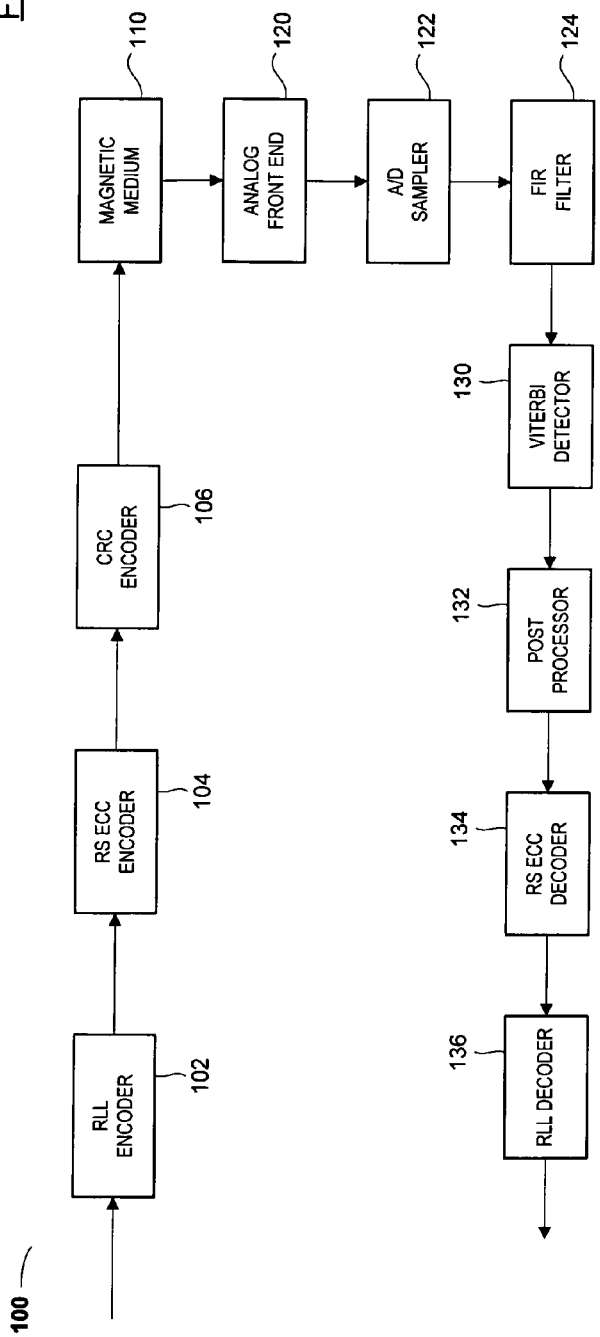
FIG. 6 is a diagram showing an exemplary implementation of a two-level (i.e., outer and inner) error correcting coding and decoding system according to the present invention.

FIG. 6 shows exemplary system diagram of a magnetic recording channel 100. On the encoding side, user data is first encoded with Run Length Limited (RLL) code by RLL encoder 102. The output of the RLL encoder 102 is then sent to outer RS ECC encoder 104. The data is finally encoded by an inner ECC encoder (CRC encoder 106), and written on to the magnetic medium 110.

On the read side, the magnetic read head (not shown explicitly in FIG. 6) will pick up the analog waveform corresponding to written data. This analog signal is passed through Analog Front End 120 and is then sampled by analog-to-digital (A/D) sampler 122. Digital samples from A/D sampler 122 are equalized by finite impulse response (FIR) filter 124, and then sent to Viterbi detector 130. A PP block 132 then tries to improve upon Viterbi decisions by taking the CRC constraint(s) into account. RS ECC decoding is then performed by RS ECC decoder 134 to remove residual errors in the digital data stream output from PP 132. Following RLL decoding at RLL decoder 136, the data is then forwarded to the user.

The following sections of present disclosure will focus on the functionality of CRC encoder 106 and PP block 132.

An Exemplary CRC Encoder

In one aspect, the present invention relates to an encoder, comprising (a) placeholding logic; (b) a CRC encoding circuit configured to compute actual CRC information for the data block; and (c) a CRC information substituting circuit. The placeholding logic is generally configured to (i) insert dummy CRC information segments at or between a plurality of predetermined positions in a data block and (ii) output a dummy-padded data block. The CRC information substituting circuit is generally configured to substitute portions of the actual CRC information for the dummy CRC information segments in the dummy-padded data block. Thus, the invention may also relate to an encoder comprising (a) means for inserting dummy CRC information segments at or between a plurality of predetermined positions in a data block; (b) means for computing actual CRC information for the data block; and (c) means for substituting portions of the actual CRC information for the dummy CRC information segments inserted into the data block.

In one embodiment, the CRC encoding circuit in present encoder comprises (i) remainder logic configured to compute a remainder for the dummy-padded data block, and (ii) parity computing logic configured to provide the actual CRC information portions to the CRC information substituting circuit. In other embodiments, the encoder further comprises a buffer configured to receive the dummy-padded data block and provide the same to the CRC information substituting circuit, and/or the CRC information substituting circuit comprises a multiplexer. Thus, various embodiments of the present invention may include (1) means for computing a remainder for the (dummy-padded) data block, (2) means for providing the actual CRC information portions to the means for substituting, (3) means for storing the dummy-padded data block and providing the same to the means for substituting, and/or (4) a means for selecting either the (dummy-padded) data block or the actual CRC information for output as CRC-encoded data.

The present encoder may be included in an encoding circuit or system, comprising the present CRC encoder, and a channel encoder configured to generate the data block. In one embodiment, the channel encoder comprises a run length limited (RLL) encoder, configured to encode data according to a plurality of coding constraints. Thus, the present invention may further relate to a means for encoding a data block, further comprising a means for channel encoding the data block, which may comprise a means for RLL encoding the data block according to a plurality of RLL coding constraints.

Figure 4:
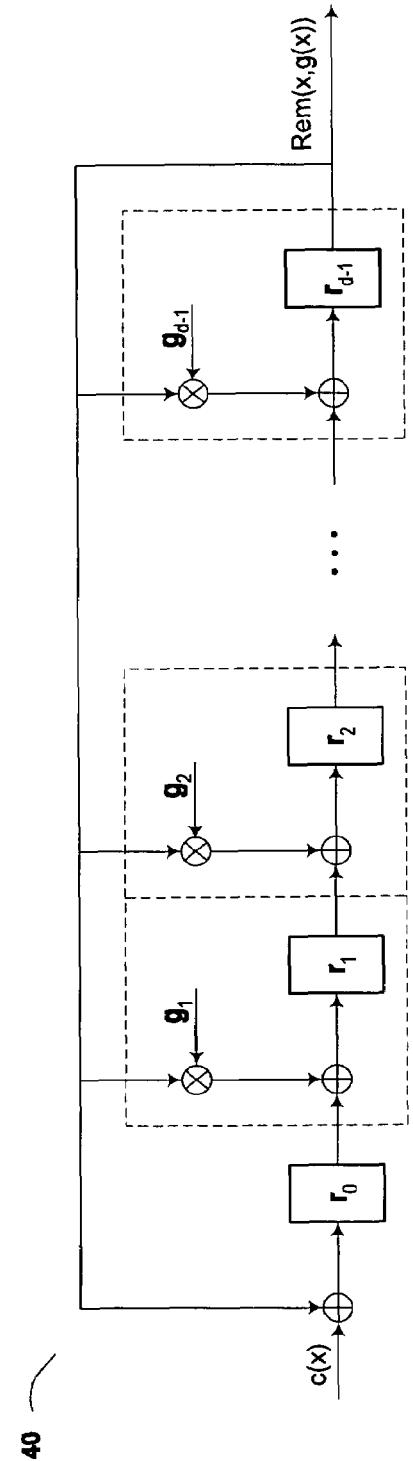
FIG. 4 is a diagram showing an implementation of remainder computing logic.
Figure 5:
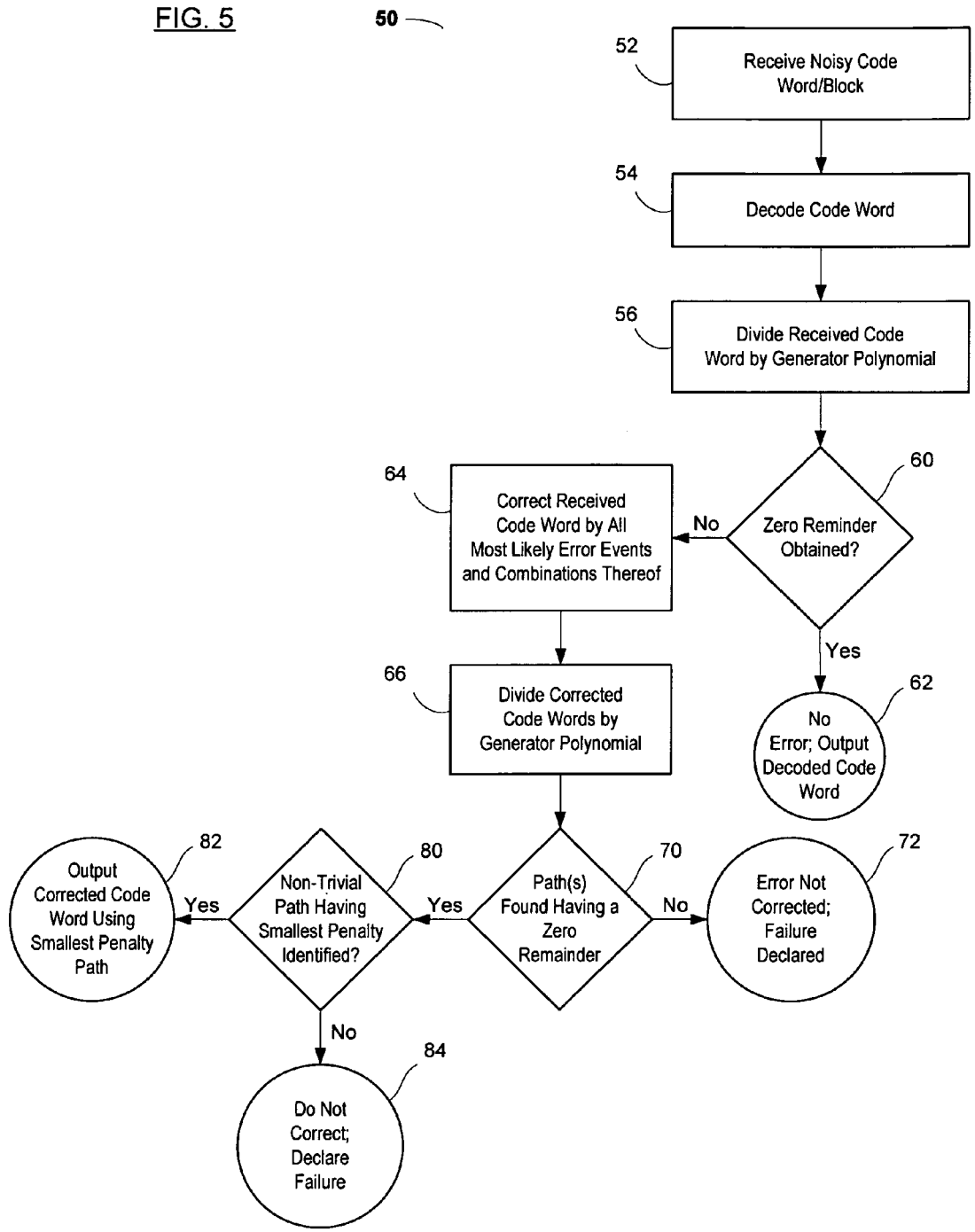
FIG. 5 is a flow chart illustrating a conventional process for error checking and correcting transmitted code.

Referring now to FIG. 6, CRC(n,k) encoder 106 partitions the incoming bit stream into the blocks of length k, and encodes each k-bit word into an n-bit codeword. Each k-bit CRC word may be denoted by w(x), and each n-bit CRC codeword by c(x). Then, a systematic encoder forms a codeword c, as $c(x)=w(x)x^d+r(x)$, where $d=(n-k)$ and is the degree of generator polynomial g(x), and $r(x)=Rem(w(x)x^d, g(x))$. The implementation of the systematic encoder may merely include or consist of polynomial division logic to compute r(x). Once the remainder is computed, it is augmented at (or concatenated with) the end of the CRC word to form the CRC codeword, c(x). FIG. 4 shows exemplary remainder logic 40, which is a conventional long division circuit.

Referring back to FIG. 6, the RS ECC and CRC encoding takes place following RLL encoding. ECC encoding is systematic, and thus, any constraint that existed in the data prior to ECC encoding is maintained following ECC encoding. However, the parity portion of the RS ECC codeword might not satisfy all RLL constraint(s) following RS ECC encoding, even if all RLL constraint(s) were met prior to RS ECC encoding. For this reason, a separate RLL encoder (not shown in FIG. 6) is often used to encode the parity portion of the RS codeword.

Unlike RS ECC redundancy (which is usually on the order of 400 bits), CRC redundancy per codeword is somewhat short, anywhere from couple of bits to about 10-20 bits. For this reason, it is not always feasible to encode CRC redundancy using a special RLL code. Instead, the CRC encoder 106 may be configured in such a way as to preserve the existing RLL constraint(s) to as great an extent as is possible. Of course, during the encoding process, RLL constraints can be a "slightly degraded" (e.g., in the case of a constraint requiring at least one transition every six bits, transmission of a codeword having one or two instances of at most six consecutive bits without a transition may not always fail). However, it is paramount to avoid total breakdown of an RLL constraint near a parity insertion region.

The preferential positions for parity insertion are dictated by the particular nature of the RLL constraint(s) existing in the data going into CRC encoder 106. Exemplary RLL codes include (d,k) and (0, G/I) codes. For (d,k) RLL code, parameter d is a constraint on the number of zero bits that must follow a bit having a digital value of one (a so-called "one" bit), and k is a constraint on the maximum number of consecutive bits having the same digital value (so-called "same state" bits). (0, G/I) code guarantees at most G consecutive bits having the same digital value, and at most I consecutive bits having the same digital value in each of the odd/even interleaves.

For example, if the data going into CRC encoder has (0, G/I) constraint(s), then inserting the parity information two bits at a time, with a sufficiently long period between insertions, is generally enough to guarantee that (0, G+2/I+1) RLL constraints will be maintained at the output of CRC encoder 106. Of course, this approach only works when n–k is even. If the number of parity bits is not even, one might opt for inserting parity bits one at a time, spaced apart by some minimum period. This would degrade the G constraint by 1, and might ruin the I constraint. To prevent breakdown in the I constraint, one might interchange odd/even interleaves in between every other pair of parity bits (e.g., successive parity bits; see FIG. 7 and the discussion thereof below).

Figure 7:
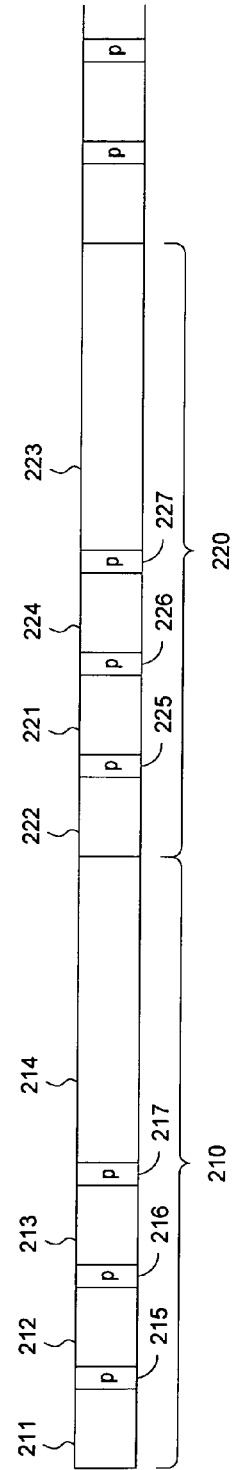
FIG. 7 is a diagram showing one implementation of successive code words encoded by the present parity encoding scheme.

FIG. 7 shows an exemplary serial data block 200, comprising code words 210 and 220. First code word 210 comprises odd and even interleaved data subblocks 211, 212, 213 and 214 and CRC parity bits 215-217, and second code word 220 comprises odd and even interleaved data subblocks 221, 222, 223 and 224 and CRC parity bits 225-227. The basic idea is to switch the even and odd interleaves between successive CRC parity bits in a given code word. For example, in any of interleaved data subblocks 211-214 and 221-224, the even interleaved data contains bits $x^{2k}$, while the odd interleaved data contains bits $x^{2k+1}$, where k=0, 1, 2, . . . . For an exemplary data stream or data subblock 0101010101, the even interleaf is given by 00000, and the odd interleaf is 11111. If a (0,G/I) RLL encoder encodes data block 200, then inserting CRC parity information into the RLL encoded data one bit at a time degrades the G constraint by 1, and can cause a complete breakdown of the I constraint.

Consider, for example, RLL encoded bits 1000000001, having eight 0's between two consecutive 1's. If a parity bit p is inserted into the stream as 10000p00001, then if p=0, there will be 9 consecutive zeros in between two ones. Thus, inserting a parity bit into RLL encoded data effectively degrades the G constraint by 1. On the other hand, if one considers, for example, RLL encoded bits 11 10 00 00 01 00 10 00 00 01 00 10, there are at most 4 zeros between two consecutive ones in both the even and odd interleaves. However, if a single parity bit is inserted, for example, as 11 10 00 00 01 00 p10 00 00 01 00 10, the interleave structure is completely changed. When p=0, the new data block becomes 11 10 00 00 01 00 01 00 00 00 10 01 0, resulting in 8 consecutive zeros in the even interleaved data.

To avoid or minimize breakdown of the G and I constraints, odd and even interleaves may be switched between successive (e.g., every other pair of) parity bits. Referring to FIG. 7, if CRC parity bit 215 is the first such parity bit inserted into first code word 210, then even/odd interleaves are swapped between parity bits 215 and 216 (in subblock or region 212), but not between parity bits 216 and 217 (in subblock or region 213). Naturally, the even and odd interleaves in first subblock 211 are not switched, either. Thus, if region 212 is originally given by the sequence '0101010101', then after swapping odd/even interleaves, it becomes '1010101010'.

Figure 8:
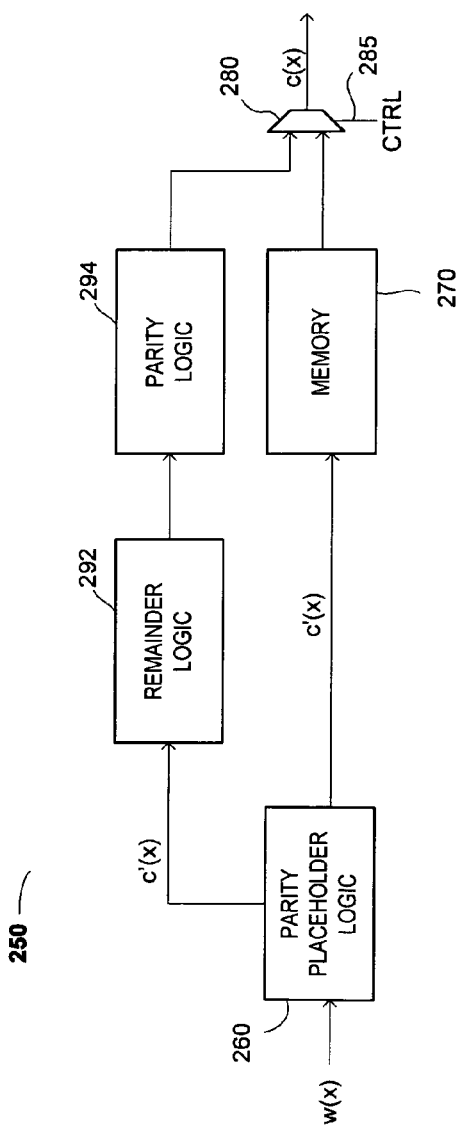
FIG. 8 is a diagram showing an embodiment of the present encoder.

It thus becomes necessary to develop an encoder that inserts parity at predetermined locations. First, let $\{l_1, l_2, \ldots l_{n-k}\}$ be a set of predetermined parity locations. An object of the present (systematic) CRC encoder is to configure the RLL encoded data with parity positions corresponding to those specified in the list of predetermined parity locations. FIG. 8 shows an exemplary CRC encoder 250, including placeholder logic 260, memory 270, multiplexer 280, remainder logic 292 and parity logic 294.

First, the input word w(x) is paced through, or input into, parity placeholder logic 260, which outputs pseudo-codeword c'(x) obtained from w(x) by inserting a zero (0) bit into every parity location specified by the list (e.g., $\{l_1, l_2, \ldots l_{n-k}\}$). Code word remainders r(x) are computed in remainder logic 292 according to the equation:

$$r(x) = Rem(c'(x), g(x)) \qquad [1]$$

The next step is to determine the true parity values, and replace the dummy zero bits in the pseudo-codeword c'(x) with the correct values, thus forming CRC codeword c(x). To this end, an (n–k) by (n–k) square binary matrix G may be defined, whose rows are given by $Rem(x^{l_i}, g(x))$.

The parity vector q is computed by parity logic 294 by solving the following equation:

$$qG + r = 0 \qquad [2]$$

over GF(2). If G is invertible, then parity vector q can be computed as $$q = rG^{-1} \qquad [3]$$

Note that $G^{-1}$ can be pre-computed and stored, once desired locations for parity insertion have been selected or determined. Multiplication of remainder vector r by $G^{-1}$ is done in parity logic block 294. If G is not invertible for some parity locations, then the particular choice of parity locations is invalid. (By extension of this concept, the list of predetermined parity locations may also be invalid.) Another choice of parity positions should be made when a set of parity locations is invalid.

Once the parity bits have been calculated, data may be shifted out from the memory 270, and in parity logic 294, actual parity bits calculated according to equation [3] above may be substituted for the dummy parity bits inserted by placeholder logic 260. Thus, multiplexer 280 may be configured to select an input thereto (i.e., memory 270 or calculated parity information), depending on the state of a control signal (e.g., CTRL 285). In turn, the state of control signal CTRL 285 may be configured to change when a predetermined parity location occurs.

The encoder structure for general binary code is generally somewhat different from that of CRC code. An exemplary encoder for binary block code may be found in U.S. patent Ser. No. 09/730,752, filed on Dec. 7, 2000, the relevant portions of which are incorporated herein by reference. Depending on the parity insertion strategy, odd/even interleaves may be interchanged in between every other pair of parity bits.

An Exemplary Post Processor Architecture

In a further aspect, the present invention concerns a post processing circuit, comprising (a) a list generator configured to (i) generate a list of most likely error events for a data block, and (ii) compute an error event remainder for each of the most likely error events; and (b) search logic configured to determine a number of error correction solutions for the received data block from (i) a remainder for the data block and (ii) the error event remainders. Thus, the invention may also relate to a post processing circuit, comprising (1) a means for generating a list of most likely error events for a data block, (2) a means for computing an error event remainder for each of the most likely error events; and (3) a means for determining a number of error correction solutions for the encoded data block from (i) a remainder for the data block and (ii) the error event remainders.

In various embodiments, the search logic comprises incidence vector logic configured to select one or more error correction solutions from the list of most likely error events, and/or the list generator comprises a memory configured to store each of the most likely error events and each of the most likely error event remainders. In the latter case, the post processing circuit may further comprise computing logic configured to determine a value for one or more parameters associated with each of the most likely error events, and the list generator may be further configured to store each of the parameter values (which may be, e.g., a penalty and/or a location in the data block). In one variation, the post processing circuit further comprises (i) a memory configured to store a plurality of the most likely error events for each dominant error event type according to the associated penalties (e.g., a local list), and/or (ii) a selector configured to select a subset of the most likely error events for the search logic. Thus, in certain embodiments, the post processing circuit may further comprise a means for storing a plurality of the most likely error events for each dominant error event type and presenting a subset of the most likely error events to the means for determining error correction solutions, and/or the present means for determining error correction solutions may comprise a means for calculating (i) one or more combinations of most likely error events that bring the received code word back into code word space and/or (ii) a remainder from a corresponding combination of such most likely error events.

In other embodiments, the search logic may be further configured to combine the most likely error events, or the most likely error event remainders, to determine the error correction solutions. Thus, the means for determining error correction solutions may further comprise a means for combining the most likely error events or the most likely error event remainders. In another variation, the present post processor may further comprise matrix processing logic configured to form a matrix from one or more of the error event remainders. As described elsewhere herein, incidence vectors generally comprise a plurality of the most likely error events (a so-called "composite error"); thus, remainders of a combination of most likely error events (or remainders corresponding to a composite error) are generally included within the meaning of "error event remainders." In one implementation, the post processor further comprises matrix augmenting logic configured to augment the matrix with a data block remainder (i.e., a remainder calculated from the data block itself). In this latter implementation, the post processor may also further comprise computing logic configured to compute the data block remainder from the data block. Thus, the present post processor may further comprise (i) a means for forming a matrix from one or more of the most likely error event remainders, and/or (ii) a means for augmenting the matrix with a data block remainder, in which case the post processor may further include a means for computing the data block remainder from the data block. As will be apparent from the following description of the exemplary post processor architecture, the search logic may comprise a matrix inverter and/or row reducing logic configured to reduce the matrix to row echelon form. Thus, the means for determining error correction solutions may comprise a means for inverting the matrix and/or a means for reducing the matrix to row echelon form.

The present post processor may, in further embodiments, comprise error correction logic configured to (i) enable outputting a corrected, decoded data block when the number of error correction solutions is one and (ii) select a most favored error correction solution and correct the data block according to the most favored error correction solution when the number of error correction solutions is more than one. The error correction logic may be further configured to (i) compute a total penalty for each error correction solution, (ii) select the most favored error correction solution according to the total penalty, and/or (iii) disallow any error correction solution comprising more than a threshold number of most likely error events. Thus, the present post processor may further comprise a means for outputting a corrected, decoded data block when the number of error correction solutions is one, a means for selecting a most favored error correction solution and correcting the data block according to the most favored error correction solution when the number of error correction solutions is more than one, and/or means for (i) computing a total penalty for each error correction solution, (ii) selecting the most favored error correction solution according to the total penalty, and/or (iii) disallowing any error correction solution comprising more than a threshold number of most likely error events.

As described above, a PP block may perform the following steps on each received CRC codeword v(x):

1. Compute the remainder r(x)=Rem(v(x), g(x)). If r(x)=0, then the Viterbi decoder has output either a codeword with no errors or a codeword that cannot be corrected using the PP block. If r(x)≠0, go to step 2.
2. Form a set of alternative paths P, where each path p in P corresponds to some dominant error event e(x) in E. For each such path, compute MLDP(e) and Rem(e(x), g(x)).
3. Limit the collection P to the N most likely error events (e.g., the error events having smallest MLDP).
4. Optionally, extend the collection P by adding paths corresponding to composite error events, whose MLDP and remainders can be computed based on similar quantities for individual components of e(x).
5. Search for the path p(x) in P corresponding to an error event or a combination of error events satisfying:
   a. Rem(p(x), g(x))=0; and
   b. Among the p(x) satisfying 5(a), choose the one with the smallest MLDP:

$$p = \min_{p' \in P}(MLDP(p')).$$

6. If step 5 produces a non-trivial candidate p(x), then correct the codeword using (best) candidate p(x); otherwise, decoder failure is declared.

Figure 9:
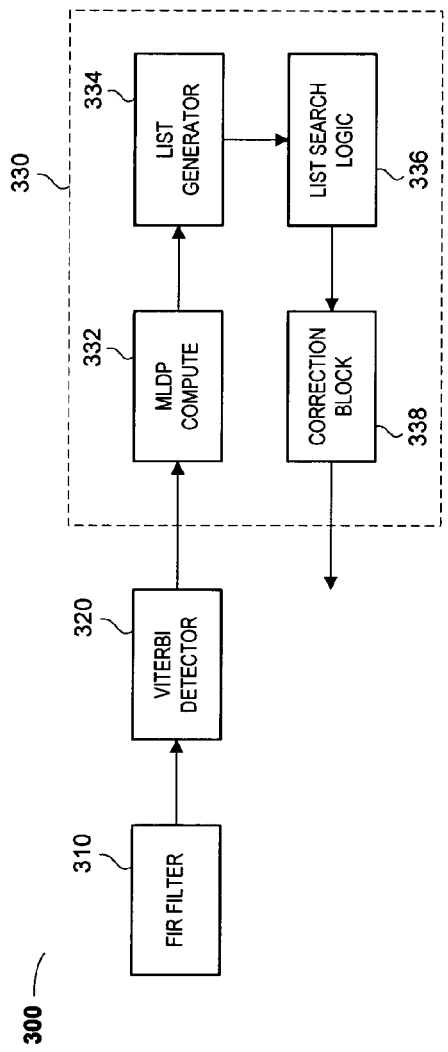
FIG. 9 is a block-level diagram of exemplary receiver and post processor circuitry according to the present invention.

FIG. 9 shows an exemplary receiver system, including FIR filter 310, Viterbi detector 320, and post processor 330. The post processor architecture 330 generally includes MLDP computing logic 332, list generator 334, list search logic 336, and correction block/logic 338. These post processor blocks will be discussed in greater detail below.

An Exemplary List Generator

Steps 2 and 3 of the PP algorithm described in the exemplary PP architecture above are generally carried out in list generator block 334, as shown in FIG. 9. For each CRC codeword, list generator 334 computes and maintains the list of most likely error events (LMLE). For each error event on the list, list generator 334 stores Rem(e(x), g(x)), the location of the error within the CRC codeword, and MLDP(e). (The exact nature of a MLDP is not essential to the present invention, and consequently, MLDPs may be computed according to any conventional technique for measuring or determining such likelihoods and/or penalties.) At any given time, the LMLE is ordered in ascending order by MLDP(e) field, and generally, such ordering is continuous (i.e., the LMLE is always ordered by ascending MLDP(e)). The list is not limited to any particular length, but in various embodiments, the LMLE can contain any number of error events reflecting a trade-off between performance and complexity. For example, in one implementation, LMLE comprises 36 error events.

At each time instance t, a linear penalty block (e.g., MLDP computing logic 332 in FIG. 9) outputs |E| penalties (one corresponding to each dominant error event ending at bit position t within the sector) to list generator 332. Let LMLE (t−1) be the set of most likely error events at time t−1. To obtain LMLE(t), list generator 334 selects the N best candidates from the union of LMLE(t−1) and a set of new candidate error events at the time t. List generator 334 has only one time cycle (e.g., clock period) to complete all of the processing described above for the exemplary list generator. This phenomenon tends to lead to unreasonably high hardware complexity. In order to manage hardware complexity, it is preferential to adapt a sub-optimal implementation for the list generator block 334.

Figure 10:
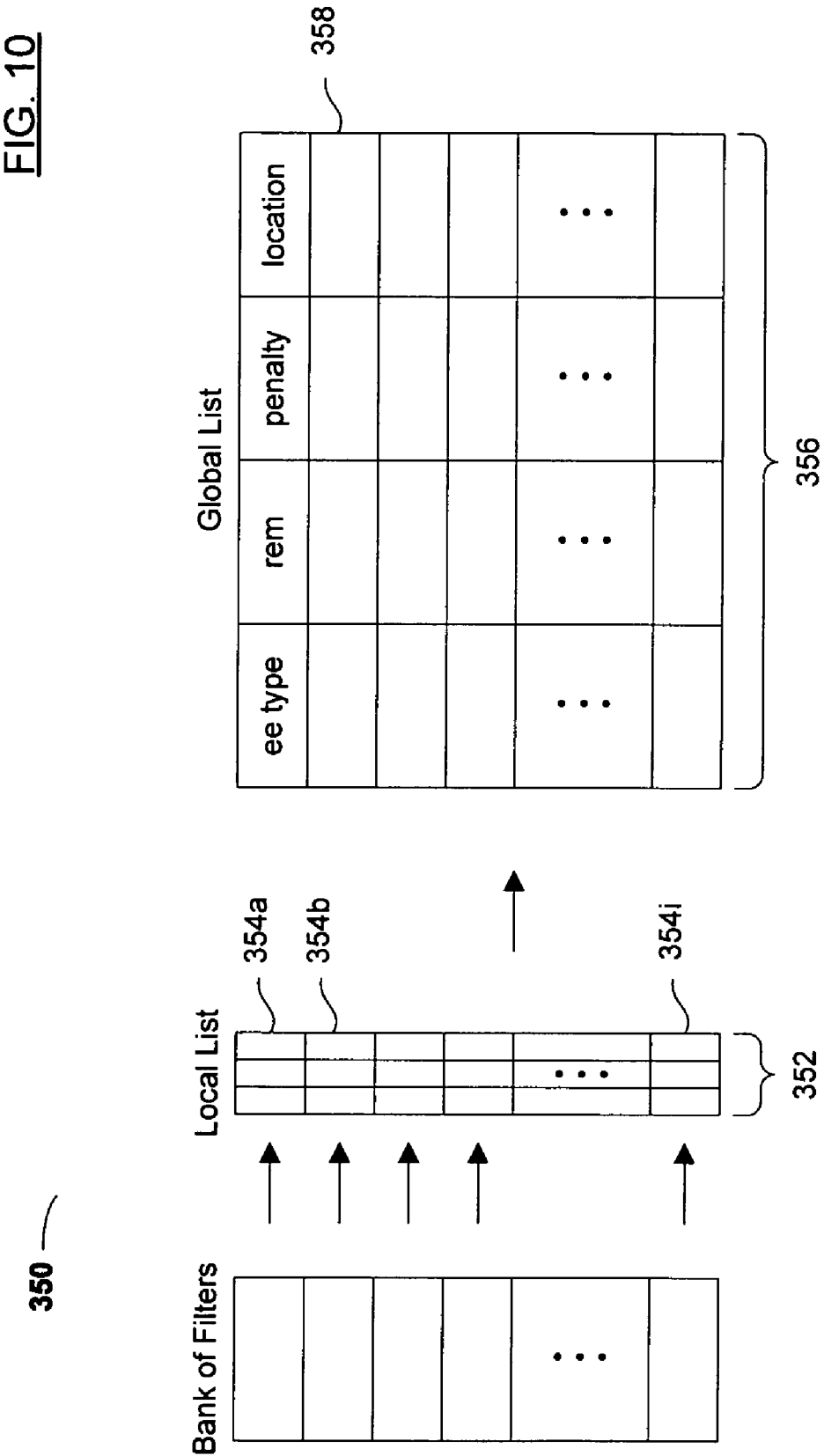
FIG. 10 is a diagram useful for demonstrating a process for updating most likely error event list(s) according to the present invention.

FIG. 10 shows a sub-optimal (and thus logically simple, but operationally effective), two-stage approach 350 to maintaining the group of most likely error events. In the first stage, for each error type, a relatively short list of the best (or most likely) recent error event candidates and their associated penalties and remainders may be identified, stored and updated in local list 354 as changes occur. Error candidates corresponding to each dominant error event type (equivalently, for each row 354a-354i of local list 352) are ordered by maximum likelihood distance penalty (MLDP), with the most likely error candidate located at the right most column. In one implementation, local list 352 may store in memory elements (e.g., registers or a look-up table) in list generator 334 up to three (3) most likely recent error event candidates (and associated penalties) for each error type (e.g., in row 354a for a first error type, 354b for a second error type, etc.). Local list 352 can, of course, store any number of recent error event candidates, but generally, at least two recent error event candidates are stored for each error type.

The second stage periodically (e.g. every 4 cycles) selects the most likely error event from the local list (i.e., choose one event in the right most column, namely the one with the smallest MLDP; this is sometimes known as a "choose 1 out of N" operation) and sends it for possible insertion into global list 356. In the context of the present hardware for error detection and/or correction, the term "global list" is generally synonymous with LMLE. Global list 356 comprises an array or plurality of memory elements (generally located in list search logic 336; see FIG. 9) similar to those used for local list 352, but generally larger than local list 352. To facilitate insertion of the updated most likely error events into global list 356, the LMLE events may be arranged (and maintained) as a square matrix. In one embodiment, the matrix is a 6×6 square. Similar to the above description, LMLE is always ordered in ascending order by MLDP, where the information is written into a matrix form, generally column-by-column.

Referring back to FIG. 10, the penalty associated with an error event selected from local list 352 is then compared against the penalties associated with error events in the first row 338 of global list 356. Assuming the updated LMLE events is in the form of an m-by-m matrix, this "m choose 1" operation determines the column in global list 356 in which the error event is to be inserted. Once the column is known, the penalty associated with an updated error event is compared against all error events in that column. This "m choose 1" operation determines the row in global list 356 in which the error event is to be stored. In one implementation, the error event in local list 352 is stored in global list 356 when its associated penalty is less than one or more of the penalties associated with the error events already stored in global list 356.

Figure 11:
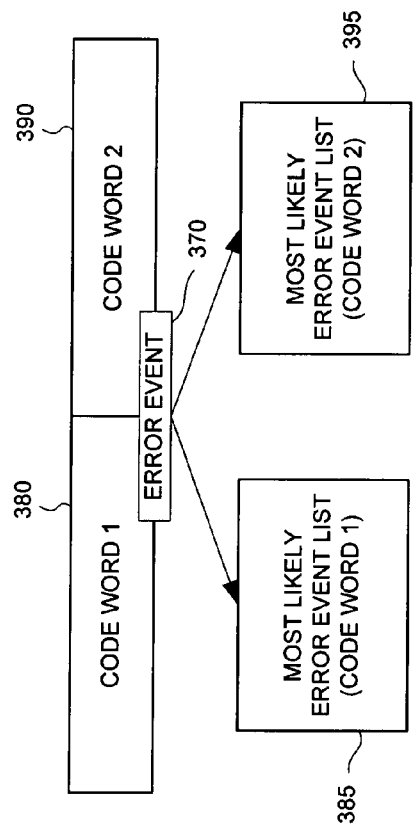
FIG. 11 is a diagram useful for explaining a process for correcting error events that bridge the interface between successive code words.

Under certain circumstances, it is possible for an error event to cross the boundary between two adjacent (consecutively received) code words. FIG. 11 shows an example of an error event 370 that occurs in part in a first code word 380 and in part in a second code word 390. In such a case, the error event 370 should be inserted (or sent for insertion) in the respective LMLEs for each code word 380 and 390.

An Exemplary Method for Computing Error Event Remainders

To compute the remainder corresponding to error events, it is convenient to represent error events in polynomial notation. To this end, a polynomial $x^l e(x)$ may be assigned to an error event, where l is the starting position of the error event in the CRC encoded data, and e(x) is the polynomial representation for error event type. For example, if e(x) is a single bit error, then e(x)=1. Similarly, if e(x) is a di-bit error, then e(x)=1+x. If such a di-bit error occurs at position l=100, then the error event may be represented as $x^{100}(1+x)$. More generally, $$e(x) = \sum_{k=0} e_k x^{l+k} \qquad [4]$$

Then, by linearity:

$$Rem(e(x), g(x)) = \sum_{k=0} e_k Rem(x^{k+l}, g(x)) \qquad [5]$$

Figure 12:
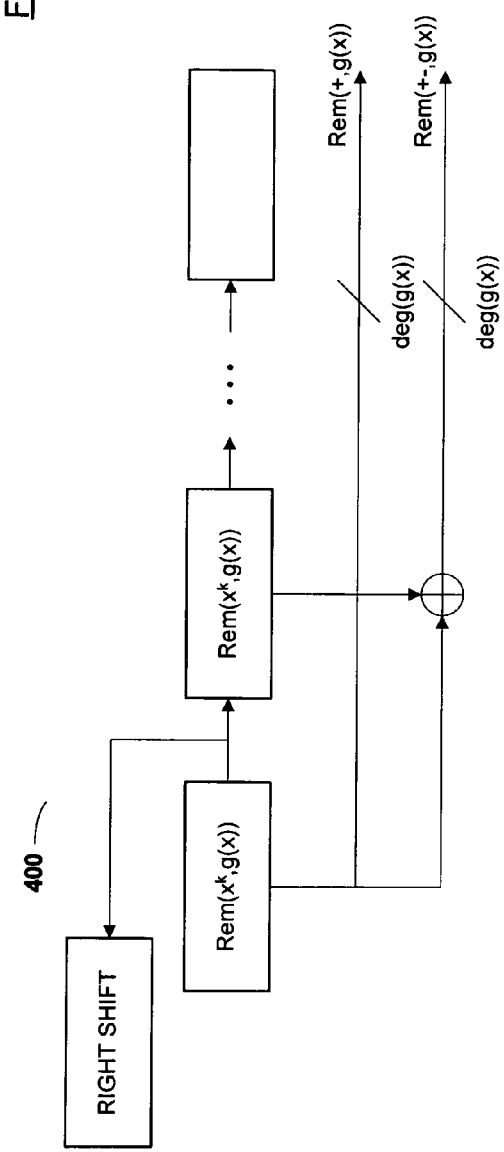
FIG. 12 is a diagram of exemplary right shift operation logic/circuitry useful in the present list generator and/or post processor circuitry.

$Rem(x^k, g(x))$ can be either (i) pre-computed and stored for all values of k=0, 1, . . . , n−1, using essentially the same divider circuit as is shown in FIG. 4, or (ii) recursively obtained from $Rem(x^{k-1}, g(x))$ by applying a conventional cyclic shift operation (e.g., a right shift) using the circuit 400 shown in FIG. 12, which is generally configured to determine the remainder for a shifted pseudo code-word from the non-shifted pseudo code word remainder.

Exemplary List Search Logic

List search logic 336 (FIG. 9) implements in hardware an algorithm that searches the LMLE to determine the correction(s) that bring in the received code word (or the output of Viterbi detector 320) back into the codeword space (steps 4 and 5 of the PP algorithm described above with regard to the exemplary post processor architecture). An exemplary list search algorithm 500 is described below and exemplified in the flow chart of FIG. 13.

As described above, let $r(x)$ be the remainder of received codeword $v(x)$. Then:

$$r(x)=Rem(v(x),g(x)) \qquad [6]$$

For purposes related to an explanation of this exemplary aspect of the invention, we will assume that $r(x)$ is not equal to a zero polynomial. Otherwise, either the received codeword $v(x)$ has no errors, or the error(s) in received codeword $v(x)$ cannot be corrected using this approach. Also, for purposes related to an explanation of this exemplary aspect of the invention, we will assume that the LMLE list generated by list generator 334 may be represented by $L=\{e_1, e_2, \ldots, e_N\}$.

Figure 13:
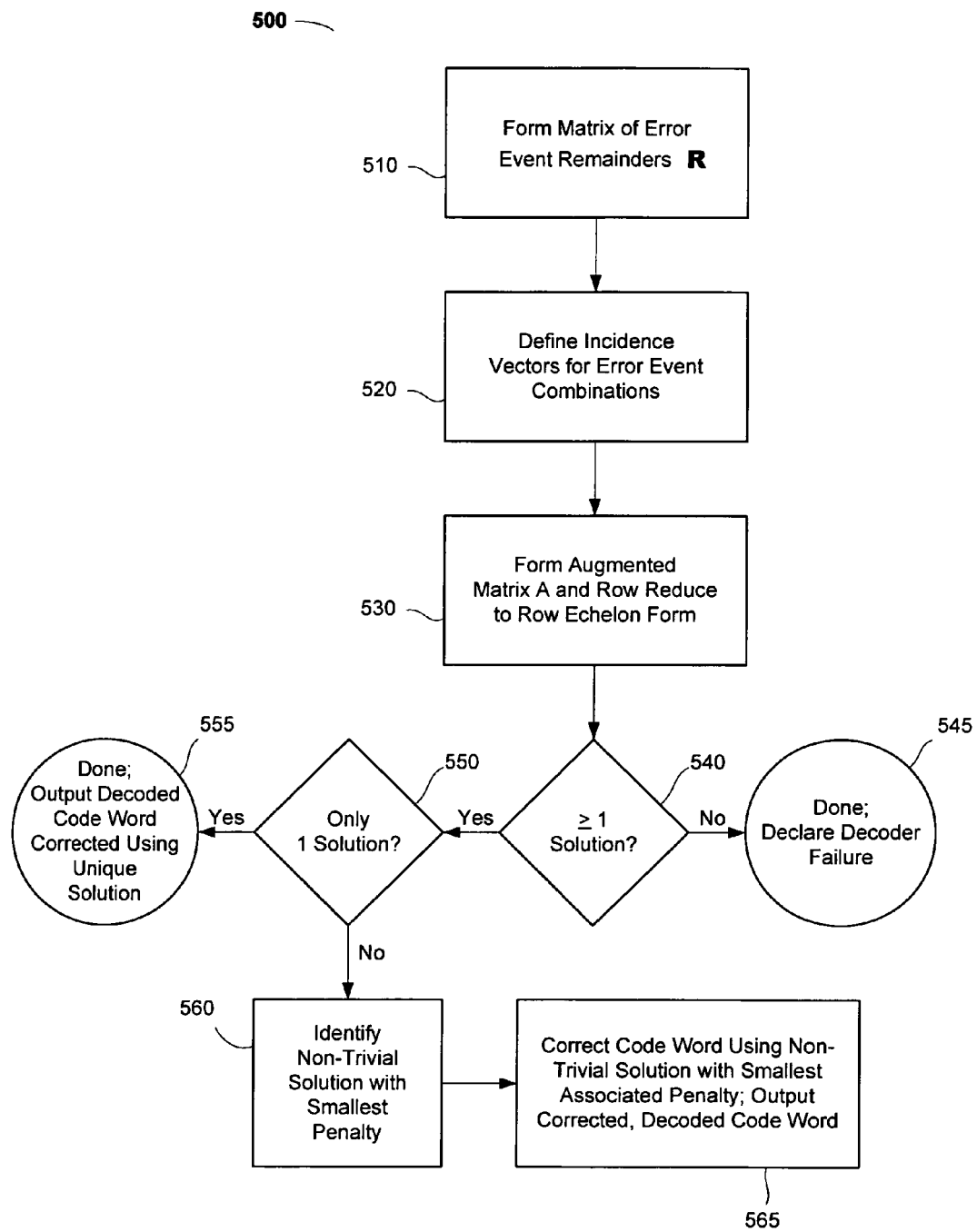
FIG. 13 is a flow chart illustrating an exemplary process for error checking and correcting received code according to the present invention.

The exemplary list search logic 336 may implement algorithm 500 as shown in FIG. 13. In a first step 510, a binary N×N matrix R whose columns are given by (or equal to) $Rem(e_k(x),g(x))$, where $k=1, 2, \ldots, N$, may be formed. In a second step 520, an N×1 binary vector a (a so-called "incidence vector") may be defined for a combination of error events. Each combination of at most N error events can be identified by its own incidence vector $\alpha$. For example, the error event combination consisting of error events $e_1$ and $e_2$ from the LMLE may have the incidence vector $\alpha=(1, 1, 0, 0, 0, \ldots, 0)$.

Then, mathematically, beginning in step 530, the search for all possible combinations of error events that bring received codeword $v(x)$ into the codeword space can be restated as simply identifying a solution set to a N×N system of linear equations $R\alpha=r$, with N unknowns (more particularly, the coefficients of incidence vector[s] $\alpha$). For example, a Gaussian elimination technique can be performed in step 530 to obtain the set of all possible solutions. In one implementation, an augmented matrix $A=[R|r]$ is formed and row reduced to a row echelon form to identify the solution set of error events and/or error event combinations that bring received codeword $v(x)$ into the codeword space.

At this point, the number of error correction solutions (generally corresponding to the paths $p(x)$ in path set P) may be determined or identified, and the next processing step taken depending on the number of solutions. Thus, at decision point 540, if there are no solutions (see outcome 545), the attempt to correct the error failed, and decoder failure is declared (e.g., no further action is taken by the decoder with respect to the processed code word other than to indicate that the error could not be corrected, which indication may be implemented as transmission of a conventional NAK signal). However, if there are one or more solutions, a decision is made at decision point 550, depending on whether there is only one solution (see outcome 555) or more than one solution (see step 560).

If there is only one solution, that solution is unique, and the corrected code word associated with that unique solution is output from correction logic/block 338 (FIG. 9) as the received sequence, decoded by Viterbi detector 320. On the other hand, if there is more than one solution, the non-trivial solution having the smallest penalty (e.g., nonlinear penalty or total linear and nonlinear penalties) is identified in step 560 (FIG. 13), and the corrected code word associated with the solution having the smallest penalty may be output from correction logic/block 338 (FIG. 9) as the sequence decoded by Viterbi detector 320.

The algorithm 500 in FIG. 13 can be applied to code words of any length. For example, in certain applications, CRC code words have a length of 40 bits (5 bytes). The present algorithm 500 is suitable for iteratively processing such CRC code words.

Application of the Search Algorithm: Simple Example #1

Let $r(x)=(1,0,0)$ and $L=\{e_1,e_2,e_3\}$ be the LMLE event list generated by list generator 352. Let R be given by the following matrix:

$$\begin{bmatrix} 1 & 1 & 0 \\ 1 & 1 & 1 \\ 0 & 0 & 1 \end{bmatrix}$$

Then the augmented matrix is:

$$\left[\begin{array}{ccc|c} 1 & 1 & 0 & 1 \\ 1 & 1 & 1 & 0 \\ 0 & 0 & 1 & 0 \end{array}\right]$$

Row reduction to solve $R\alpha=r$ gives:

$$\left[\begin{array}{ccc|c} 1 & 1 & 0 & 1 \\ 1 & 1 & 1 & 0 \\ 0 & 0 & 1 & 0 \end{array}\right] \rightarrow \left[\begin{array}{ccc|c} 1 & 1 & 0 & 1 \\ 0 & 0 & 1 & 1 \\ 0 & 0 & 1 & 0 \end{array}\right] \rightarrow \left[\begin{array}{ccc|c} 1 & 1 & 0 & 1 \\ 0 & 0 & 1 & 1 \\ 0 & 0 & 0 & 1 \end{array}\right]$$

The left portion (i.e., the first three columns) of the last row is all zeros, but the right portion (i.e., the position in the augmented column of the last row) is one. Therefore, there are no solutions.

Application of the Search Algorithm: Simple Example #2

Let $r(x)=(1,0,0)$ and $L=\{e_1,e_2,e_3\}$ be the LMLE event list generated by list generator 352. Let R be given by the following matrix:

$$\begin{bmatrix} 1 & 1 & 0 \\ 1 & 1 & 1 \\ 0 & 1 & 1 \end{bmatrix}$$

Then the augmented matrix is:

$$\left[\begin{array}{ccc|c} 1 & 1 & 0 & 1 \\ 1 & 1 & 1 & 0 \\ 0 & 1 & 1 & 0 \end{array}\right]$$

Row reduction to solve $R\alpha=r$ gives:

$$\left[\begin{array}{ccc|c} 1 & 1 & 0 & 1 \\ 1 & 1 & 1 & 0 \\ 0 & 1 & 1 & 0 \end{array}\right] \rightarrow \left[\begin{array}{ccc|c} 1 & 1 & 0 & 1 \\ 0 & 0 & 1 & 1 \\ 0 & 1 & 1 & 0 \end{array}\right] \rightarrow \left[\begin{array}{ccc|c} 1 & 1 & 0 & 1 \\ 0 & 1 & 1 & 0 \\ 0 & 0 & 1 & 1 \end{array}\right] \rightarrow$$

-continued $$\begin{bmatrix} 1 & 0 & 1 & | & 1 \\ 0 & 1 & 1 & | & 0 \\ 0 & 0 & 1 & | & 1 \end{bmatrix} \rightarrow \begin{bmatrix} 1 & 0 & 0 & | & 0 \\ 0 & 1 & 0 & | & 1 \\ 0 & 0 & 1 & | & 1 \end{bmatrix}$$

The left portion of the matrix is the identity matrix. As a result, there is a unique solution defined by the right portion (i.e., the last column) of the matrix, (0,1,1).

Application of the Search Algorithm: Simple Example #3
Let $r(x)=(1,1,0)$ and $L=\{e_1,e_2,e_3\}$ be the LMLE event list generated by list generator 352. Let R be given by the following matrix:

$$\begin{bmatrix} 1 & 1 & 0 \\ 0 & 1 & 1 \\ 1 & 0 & 1 \end{bmatrix}$$

Then the augmented matrix is:

$$\begin{bmatrix} 1 & 1 & 0 & | & 1 \\ 0 & 1 & 1 & | & 1 \\ 1 & 0 & 1 & | & 0 \end{bmatrix}$$

Row reduction to solve $R\alpha=r$ gives:

$$\begin{bmatrix} 1 & 1 & 0 & | & 1 \\ 0 & 1 & 1 & | & 1 \\ 1 & 0 & 1 & | & 0 \end{bmatrix} \rightarrow \begin{bmatrix} 1 & 1 & 0 & | & 1 \\ 0 & 1 & 1 & | & 1 \\ 0 & 1 & 1 & | & 1 \end{bmatrix} \rightarrow \begin{bmatrix} 1 & 0 & 1 & | & 0 \\ 0 & 1 & 1 & | & 1 \\ 0 & 0 & 0 & | & 0 \end{bmatrix}$$

The reduced matrix has an "all zeros" row (the last row). As a result, $\alpha_3$ is a free variable, and there is one solution, defined in part by the right portion of the matrix, for each value of the free variable. Therefore, when $\alpha_3=0$, the solution is (0,1,0), and when $\alpha_3=1$, the solution is (1,0,1).

Exemplary Correction Logic

If the list search algorithm 500 fails to find a solution, then correction logic 338 (FIG. 9) generally performs no error correcting function(s). When multiple solutions are found, correction block can choose a best solution based on the MLDP and/or number of component error events.

In order to minimize the mis-correction probability, correction block 338 can also apply a threshold based on the MLDP and/or number of component error events. For example, correction block 338 may choose not to correct an error event, e, if the associated MLDP(e) is greater than a preset or predetermined threshold. If MLDP(e) is larger than the predetermined threshold, then one may reasonably assume that the likelihood of $v(x)+e(x)$ being a correct codeword is lower than the likelihood that the codeword output by the Viterbi detector 320 is correct without subsequent error correction. Therefore, even if e brings $v(x)$ back into codeword space, it might not be a true error event when MLDP(e) is larger than the predetermined threshold, which would ultimately lead to a mis-correction. In the presence of outer RS ECC, it is often more advantageous to be cautious and not correct a codeword using an error event having an unacceptably large MLDP, since not correcting an error (i.e., the PP output has generally same error as was present following the Viterbi detector 320) might be better than mis-correcting (i.e., the output of the PP block may contain more errors than were present in the received codeword).

For the same reason, it might be advantageous not to correct composite errors which have more than M components. For example, composite error events having more than a predetermined number of components M may have a relatively small likelihood of existence.

Finally, the correction block 338 may choose to disallow certain composite error events, the components of which either overlap or come unacceptably close to each other. For these error events, the MLDP(e) does not necessarily equal the sum of the MLDP of each component.

The System and Network

In further aspects, the present invention concerns a decoder, comprising (1) a Viterbi detector configured to decode the data block; and (2) the present post processor circuit. In one implementation, the data block comprises RLL code, and the decoder further comprises a RLL decoder. In other embodiments, the decoder (and in one embodiment, the post processor) further comprises decision logic configured to output a modified or corrected Viterbi detector output, and optionally, instruct error correction logic to select a most favored error correction solution and correct the data block according to the most favored error correction solution (e.g., when the number of error correction solutions is more than one). In one embodiment, the decision logic instructs the post processor to output a corrected, decoded data block when the number of error correction solutions is one.

The present invention may also relate to a receiver, comprising: a finite impulse response (FIR) filter and the present decoder, configured to receive an output from the FIR filter. The FIR filter may be configured to receive a digital output from an analog-to-digital converter (e.g., A/D sampler 122 in FIG. 6) that receives an analog waveform (e.g., from a channel, such as a magnetic recording medium) corresponding to the data block.

In further embodiments, the present invention concerns a system, comprising the present receiver and an encoder (such as the exemplary CRC encoder described above), configured to form the data block. The system may further comprise a magnetic recording medium configured to receive, store and provide access to the data block.

In further embodiments, the system may be part of a larger network, comprising (a) a plurality of the present systems, communicatively coupled to each other; and (b) a plurality of storage and/or communications devices, wherein each storage or communications device is communicatively coupled to one of the systems. The network may be any kind of known network, such as a storage network (e.g., RAID array), Ethernet, or wireless network, but preferably, the network comprises a storage network, and at least a plurality of the coupled storage and/or communications devices comprise magnetic storage devices.

An Exemplary Method for Identifying and Correcting Errors

In a further embodiment, the invention pertains to a method of identifying and/or correcting one or more errors in a data block, comprising the steps of (a) forming a matrix from one or more error event remainders; (b) augmenting the matrix with a data block remainder; and (c) determining, by Gaussian elimination, a number of error events or combinations thereof (e.g., incidence vectors) which bring the received codeword into the codeword space. Also, as discussed herein, the invention relates to binary block codes and/or syndromes therefor. Consequently, the invention also pertains to a method of identifying and/or correcting one or more errors in a binary data block, comprising the steps of: (a) forming a matrix from one or more error event syndromes; (b) augmenting the matrix with a binary data block syndrome; and (c) determining, by Gaussian elimination, a number of error correction solutions for the binary data block in the augmented matrix. Any aspect of the present invention that relates to identifying and/or correcting one or more errors in a data block using CRC code and/or remainders that can also apply to binary block codes and/or syndromes therefor is applicable to the method described in the preceding sentence.

In one embodiment, the method may further comprise (i) computing each of the error event remainders from a list of most likely error events. Such computing may, in turn, comprise (i) pre-computing the error event remainder for each of the most likely error events in the list and (ii) storing the pre-computed error event remainders in a readable memory, or alternatively, (iii) recursively computing the error event remainders from an error event in the data block. In one implementation of this embodiment, the method further comprises generating the list of most likely error events (each of which may correspond to a dominant error event type; note that more than one most likely error event can correspond to a particular dominant error event type). The list of most likely error events may be generated by (i) compiling a local list of most likely candidates for each type of error event, and (ii) periodically selecting a best candidate from the local list for inclusion in the most likely error event list.

In further embodiments, the method may further comprise computing the data block remainder from the (received) data block; generating an error event matrix from the most likely error event remainders; defining the incidence vectors from the error event matrix; computing one or more remainders corresponding to a composite error from a corresponding incidence vector, each of the incidence vector(s) comprising a plurality (or combination) of most likely error events; computing a penalty associated with each of the incidence vectors and/or the most likely error events; selecting a most favored (or best) error correction solution according to the penalties; and/or performing a successive operation on the data block, depending on the determined number of error correction solutions. In the latter case, the successive operation comprises: not correcting the data block when the number of error correction solutions is zero (0); outputting a corrected, decoded data block when the number of error correction solutions is at least one (1); and/or selecting a most favored error correction solution and correcting the data block according to the most favored error correction solution when the number of error correction solutions is more than one.

In one implementation of the present method, the step of determining the number of error correction solutions comprises row reducing the augmented matrix to row echelon form. In another, the matrix of error event remainders and/or remainders corresponding to a composite error is invertible.

Exemplary Software

The present invention also includes algorithms, computer program(s) and/or software, implementable and/or executable in a general purpose computer or workstation equipped with a conventional digital signal processor, configured to perform one or more steps of the method and/or one or more operations of the hardware. Thus, a further aspect of the invention relates to algorithms and/or software that implement the above method(s). For example, the invention may further relate to a computer program, computer-readable medium or waveform containing a set of instructions which, when executed by an appropriate processing device (e.g., a signal processing device, such as a microcontroller, microprocessor or DSP device), is configured to perform the above-described method and/or algorithm.

For example, the computer program may be on any kind of readable medium, and the computer-readable medium may comprise any medium that can be read by a processing device configured to read the medium and execute code stored thereon or therein, such as a floppy disk, CD-ROM, magnetic tape or hard disk drive. Such code may comprise object code, source code and/or binary code.

The waveform is generally configured for transmission through an appropriate medium, such as copper wire, a conventional twisted pair wireline, a conventional network cable, a conventional optical data transmission cable, or even air or a vacuum (e.g., outer space) for wireless signal transmissions. The waveform and/or code for implementing the present method(s) are generally digital, and are generally configured for processing by a conventional digital data processor (e.g., a microprocessor, microcontroller, or logic circuit such as a programmable gate array, programmable logic circuit/device or application-specific [integrated] circuit).

CONCLUSION/SUMMARY

Thus, the present invention provides circuits, architectures, systems, methods and algorithms for joint channel-code detectors, particularly for linear block codes, and more specifically for encoding CRC (or parity) information and/or for identifying, detecting and/or correcting one or more errors in a data block or code word. In one important aspect, the invention focuses on use of syndromes or remainders to determine errors in code words. Although suboptimal, the present error detection scheme based on syndromes or remainders involves simpler computations and/or manipulations, and is generally logically easier to implement, than previous "brute-force" methods involving trying all $2^N$ combinations of N most likely error events. Thus, the present invention meets a long-felt need for a scheme to manage error detection and/or correction in systems (such as magnetic recording applications) where there may be a relatively large list of most likely and/or likely errors.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A circuit, comprising:
   a) a list generator configured to (i) generate a list consisting of a subset of most likely error events for each of a plurality of dominant error types for a data block, and (ii) compute an error event remainder for each of said most likely error events; and
   b) search logic configured to select a number of error correction solutions for said data block from (i) said error event remainders and (ii) a remainder for said data block.

2. The circuit of claim 1, wherein said search logic comprises incidence vector logic configured to calculate one or more incidence vectors from said most likely error events.

3. The circuit of claim 1, wherein said search logic is further configured to combine said most likely error events or said error event remainders to determine said error correction solutions.

4. The circuit of claim 1, further comprising matrix processing logic configured to form a matrix from said error event remainders.

5. The circuit of claim 4, further comprising matrix augmenting logic configured to augment said matrix with said remainder for said data block.

6. The circuit of claim 5, wherein said search logic further comprises row reducing logic configured to reduce said matrix to row echelon form.

7. The circuit of claim 1, further comprising error correction logic configured to (i) enable outputting a corrected, decoded data block when the number of error correction solutions is one, and (ii) select a most favored error correction solution and correct said data block according to said most favored error correction solution when the number of error correction solutions is more than one.

8. The circuit of claim 7, wherein said error correction logic is further configured to (i) compute a total penalty for each error correction solution, and (ii) select said most favored error correction solution according to said total penalty.

9. The circuit of claim 7, wherein said error correction logic is further configured to disallow any error correction solution comprising more than a threshold number of said most likely error events.

10. The circuit of claim 1, wherein said list generator comprises a memory configured to store each of said most likely error events and each of said error event remainders.

11. The circuit of claim 10, further comprising computing logic configured to determine a value for one or more parameters associated with each of said most likely error events, wherein said list generator is further configured to store each of said parameter values.

12. The circuit of claim 11, wherein at least one of said parameters associated with each of said most likely error events is selected from the group consisting of a penalty and a location in said data block.

13. The circuit of claim 12, further comprising a memory configured to store a plurality of said most likely error events for each error event type according to said associated penalties.

14. A decoder, comprising:
  a) a Viterbi detector configured to decode said data block; and
  b) the circuit of claim 1.

15. The decoder of claim 14, wherein said data block comprises a run length limited (RLL) code, and said decoder further comprises a RLL decoder.

16. The decoder of claim 15, further comprising decision logic configured to:
  a) instruct said Viterbi detector, said circuit and/or said RLL decoder to output a corrected, decoded data block when the number of error correction solutions is one (1); and
  b) instruct error correction logic to select a most favored error correction solution and correct said data block according to said most favored error correction solution when the number of error correction solutions is more than one.

17. A receiver, comprising:
  a) a finite impulse response (FIR) filter configured to receive a waveform corresponding to said data block;
  b) the decoder of claim 14.

18. A system, comprising:
  a) the receiver of claim 17; and
  b) an encoder, configured to form said data block.

19. The system of claim 18, further comprising a magnetic recording medium configured to receive, store and provide access to said data block.

20. The system of claim 18, wherein said encoder comprises:
  a) placeholding logic configured to (i) insert dummy CRC information segments at or between a plurality of predetermined positions in a data block and (ii) output a dummy-padded data block;
  b) a CRC encoding circuit configured to compute actual CRC information for said data block; and
  c) a CRC information substituting circuit, configured to substitute portions of said actual CRC information for said dummy CRC information segments in said dummy-padded data block.

21. The system of claim 20, wherein said CRC encoding circuit comprises (i) remainder logic configured to compute a remainder for said dummy-padded data block, and (ii) parity computing logic configured to provide said actual CRC information portions to said CRC information substituting circuit.

22. The system of claim 20, wherein said encoder further comprises a buffer configured to receive said dummy-padded data block and provide the same to said CRC information substituting circuit.

23. The system of claim 20, wherein said CRC information substituting circuit comprises a multiplexer.

24. The system of claim 20, wherein said encoder further comprises a run length limited (RLL) encoder, configured to encode data according to a plurality of coding constraints.

25. A method of identifying and/or correcting one or more errors in a data block, comprising:
  a) forming a matrix from a plurality of error event remainders computed from a list consisting of a subset of most likely error events for each of a plurality of dominant error types for the data block;
  b) augmenting said matrix with a remainder for said data block; and
  c) determining, by Gaussian elimination, a number of error correction solutions for said data block in said augmented matrix.

26. The method of claim 25, further comprising computing said data block remainder from said data block.

27. The method of claim 25, further comprising defining one or more incidence vectors from said matrix, and computing one or more remainders corresponding to a composite error from a corresponding incidence vector.

28. The method of claim 25, wherein the step of determining the number of error correction solutions comprises row reducing said augmented matrix to row echelon form.

29. A computer readable medium comprising a computer-executable set of instructions adapted to perform the method of claim 25.

30. The method of claim 25, further comprising computing each of said error event remainders from the list of most likely error events.

31. The method of claim 30, further comprising generating said list of most likely error events.

32. The method of claim 31, wherein generating said list of most likely error events comprises (i) compiling a local list of most likely candidates for each type of error event, and (ii) periodically selecting a best candidate from said local list for inclusion in said most likely error event list.

33. The method of claim 30, further comprising computing one or more remainders corresponding to a composite error from a corresponding incidence vector, each of said incidence vector(s) comprising a plurality of said most likely error events.

34. The method of claim 33, further comprising computing a penalty associated with each of said composite errors and/or said most likely error events.

35. The method of claim 34, further comprising selecting a most favored error correction solution according to said penalties.

* * * * *

UNITED STATES PATENT AND TRADEMARK OFFICE
CERTIFICATE OF CORRECTION

PATENT NO. : 7,571,372 B1 Page 1 of 1
APPLICATION NO. : 11/166548
DATED : August 4, 2009
INVENTOR(S) : Burd et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1075 days.

Signed and Sealed this

Seventh Day of September, 2010

David J. Kappos
*Director of the United States Patent and Trademark Office*